United States Patent [19]
Taylor et al.

[11] Patent Number: 5,448,052
[45] Date of Patent: Sep. 5, 1995

[54] DEVICE AND METHOD FOR OBJECT IDENTIFICATION USING OPTICAL PHASE CONJUGATION

[75] Inventors: Travis S. Taylor, Somerville; Debbee B. Jordan, Huntsville, both of Ala.

[73] Assignee: The United States of America as represented by the Secretary of the Army, Washington, D.C.

[21] Appl. No.: 105,162

[22] Filed: Aug. 12, 1993

[51] Int. Cl.⁶ .................... G01J 1/20; H04B 10/00; G06K 9/00

[52] U.S. Cl. ............................ 250/201.9; 359/155; 359/161; 382/103

[58] Field of Search ............... 382/1; 250/201.9; 359/155, 161, 168, 169, 174, 170

[56] References Cited

U.S. PATENT DOCUMENTS

| | | | |
|---|---|---|---|
| 3,779,492 | 12/1973 | Grumet | 244/3.17 |
| 4,063,819 | 12/1977 | Hayes . | |
| 4,866,781 | 9/1989 | Borken et al. | 382/1 |
| 5,166,507 | 11/1992 | Davis et al. | 250/201.9 |
| 5,317,442 | 5/1994 | Sharp et al. | 359/170 |

Primary Examiner—Stephen C. Buczinski
Attorney, Agent, or Firm—Anthony T. Lane; Hay Kyung Chang

[57] ABSTRACT

The first identification device located on first vehicle embeds a pre-determined pattern in an outgoing radiation and detects radiation incoming from a second identification device located on second vehicle. The two identification devices are identical to each other in their function. The first device phase-conjugates the incoming radiation and the result is combined with the pattern-containing radiation. The combination is then emitted toward the second device along the exact same optical path as the one taken by the incoming radiation in accordance with the principle of phase conjugation. The second device isolates the pattern from the combination radiation and, if the pattern is recognized, identifies the first vehicle as friendly. The the second device may engage in the same sequence of beamings as performed by the first device to identify itself (the second object to the first object. The utilization of phase conjugation eliminates the need for complex aimers in directing radiation toward objects as well as removing any atmospheric distortions from the radiation on its return trip.

7 Claims, 4 Drawing Sheets

DEVICE AND METHOD FOR OBJECT IDENTIFICATION USING OPTICAL PHASE CONJUGATION

DEDICATORY CLAUSE

The invention-described herein may be manufactured, used, and licensed by or for the Government for governmental purposes without the payment to us of any royalties thereon.

BACKGROUND OF THE INVENTION

On modern battlefields where weaponry embodying sophisticated technology abounds, occasionally and regrettably the destruction of friendly vehicles and personnel have occurred because their friendly identity was not or could not be ascertained. No matter how small in number, such occurrences or even the possibility of such occurrences are morally and politically repugnant. An urgent and critical need exists for a means of obtaining the positive identification of a potential target.

SUMMARY OF THE INVENTION

The device and method of instant invention accomplish the identification of friend or foe (IFF) stat,us of a potential target by using the principle of optical phase conjugation to encode a laser beam with pre-determined image information while maintaining adequate signal strength for detection of the beam at great distances from its source. Taking a high performance aircraft and a tank on the ground as an example of vehicles facing each other, the friendly nature of each in doubt to the other, the friend-or-foe identification of the tank can be attempted by the aircraft using the device of invention by directing a probe beam toward the tank. The tank, also equipped with the device of invention, phase-conjugates the beam upon receiving it from the aircraft, and further incorporates a pre-determined pattern into the beam prior to sending the phase-conjugated beam along its original optical path back to its source. The aircraft receives the returned beam and, after appropriate processing by the device of invention, recognizes the embedded pattern, if it was previously agreed upon among the friendly forces, as one emanating from a friendly vehicle. The aircraft, then may send to the tank a beam incorporating the same pattern to identify itself as friendly.

DESCRIPTION OF THE PREFERRED EMBODIMENT

Figure 1A:
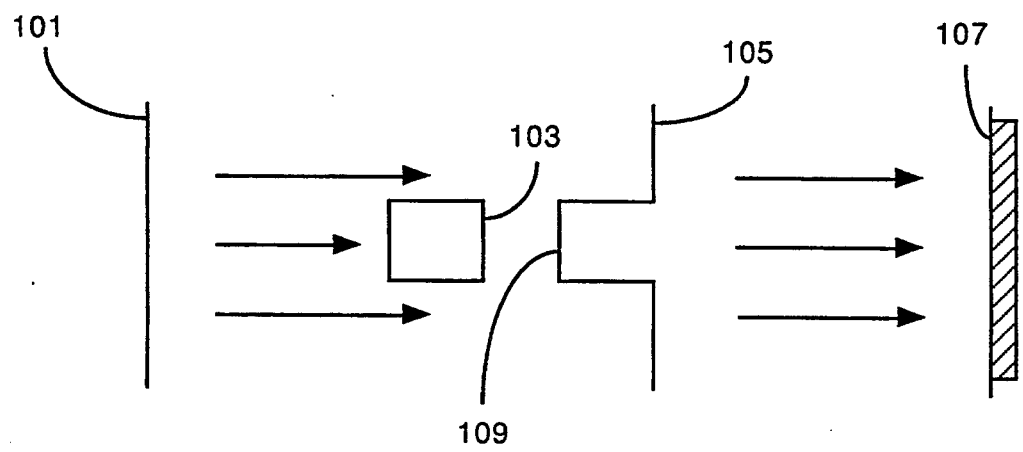
FIGS. 1 and 2 illustrate optical energy reflected from an ordinary mirror and a phase conjugating mirror, respectively, and show differences therebetween.
Figure 1B:
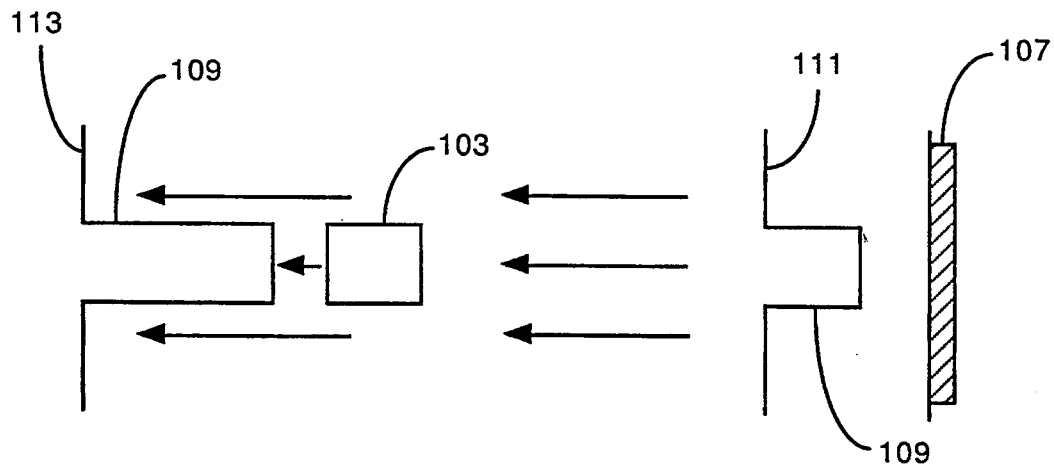
Figure 2A:
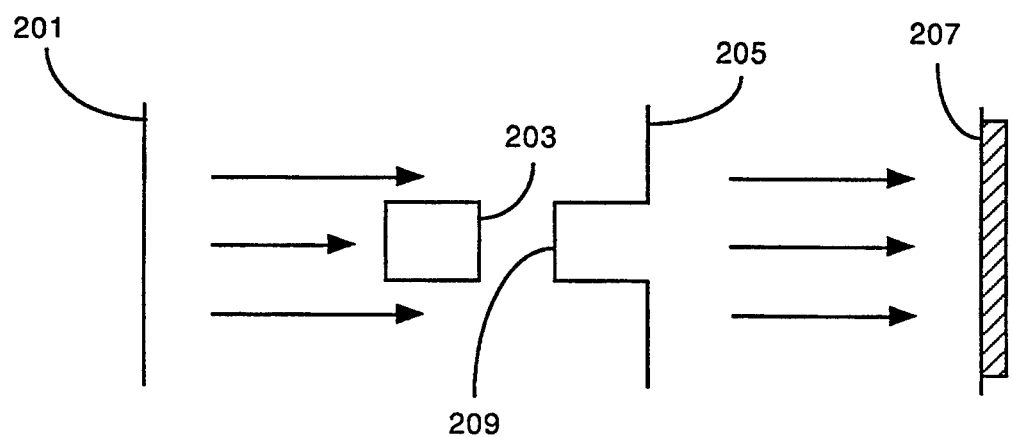
Figure 2B:
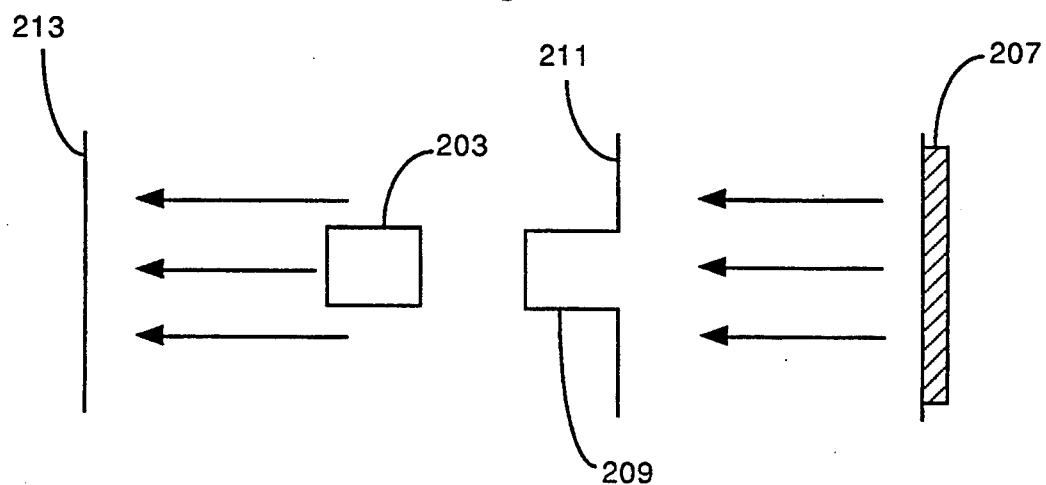

A unique characteristic of optical phase conjugation is that the conjugated beam travels along the same optical path as the original beam but in the exact opposite direction with no reversing of the image. This characteristic obviates the need for complex aiming system when utilizing optical phase conjugation principle, as well as eliminating any concern over distortions that are introduced into the beam on its initial trip. All such distortions are removed from the phase conjugated beam on its return trip. The difference between beams reflected from an ordinary mirror and phase conjugating mirror, respectively, is illustrated with reference to FIGS. 1 and 2 wherein, as in subsequent figures, like numbers refer to like parts and solid arrows indicate optical paths. In FIG. 1A, plane wave of radiation 101 propagates in the direction of the arrows and encounters interference 103 from which it emerges as distorted beam 105 with distortion 109. As seen in FIG. 1B, when reflected from ordinary mirror 107, the image is reversed. The reflected distorted beam 111 encounters interference 103 in its path and emerges therefrom with distortion 109 magnified. However, when a beam is reflected from a phase conjugating mirror such as 207, only the direction of propagation is reversed, but not the image. Beams 205 and 211 are not mirror images of each other but are identical except in the directions of their travel. When phase conjugated beam 211 encounters interference 203 on its return trip, distortion 209, introduced into the beam in its initial trip by the interference, is removed and what emerges is plane wave 213 in its original pristine state.

Figure 3:
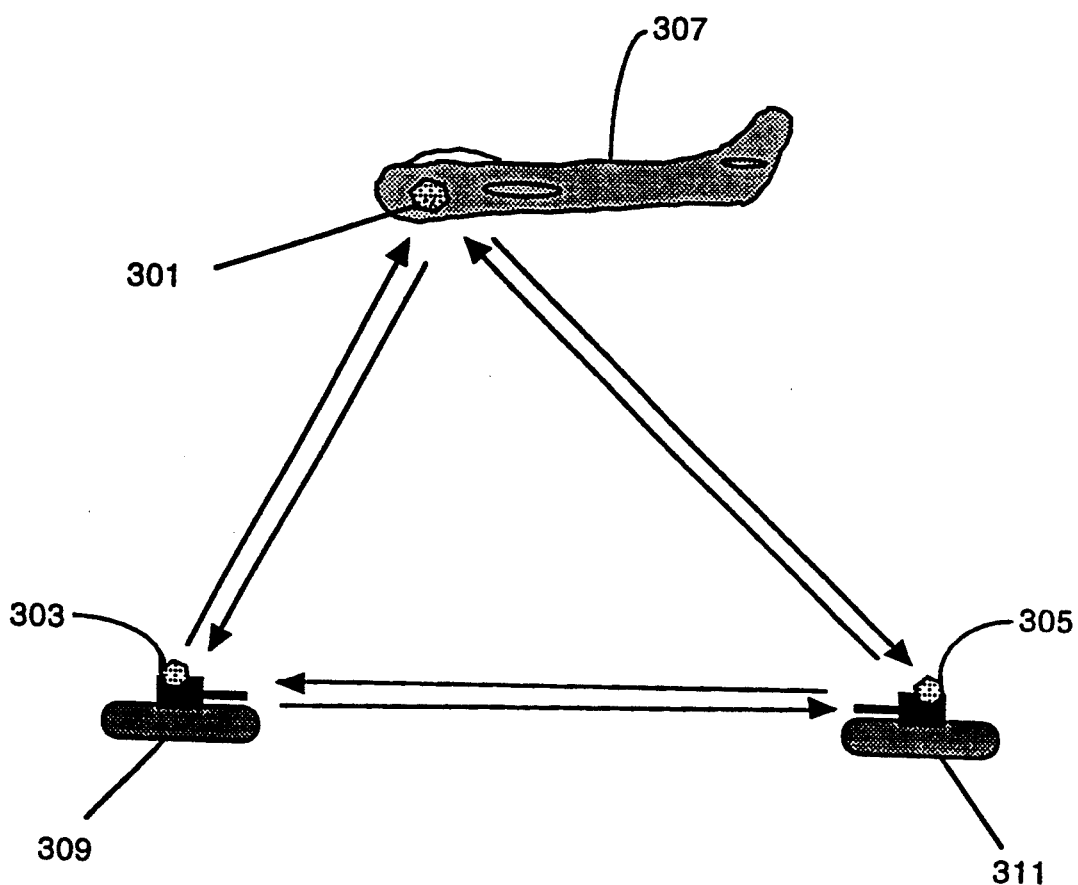
FIG. 3 shows a network composed of three identification devices, each located on a different battlefield vehicle.

The above-described unique property of optical phase conjugation is used to advantage in the instant invention, the device and method of object identification. FIG. 3 shows how a network can be set up in which a plurality of the identification devices, each being identical to the other and suitably located on a vehicle on the battlefield, communicate with each other to ascertain their respective vehicle's belligerent affiliation. Even though FIG. 3 shows only three identification devices, it is for illustrative purposes only and the network can be as expansive as there are identification devices communicating with each other. Of course, it goes without saying that if there is a vehicle on the battle scene which is not equipped with the identification device and thus cannot appropriately respond to an interrogation from a vehicle with the identification device, then the non-equipped vehicle is susceptible to becoming a target for destruction.

Figure 4:
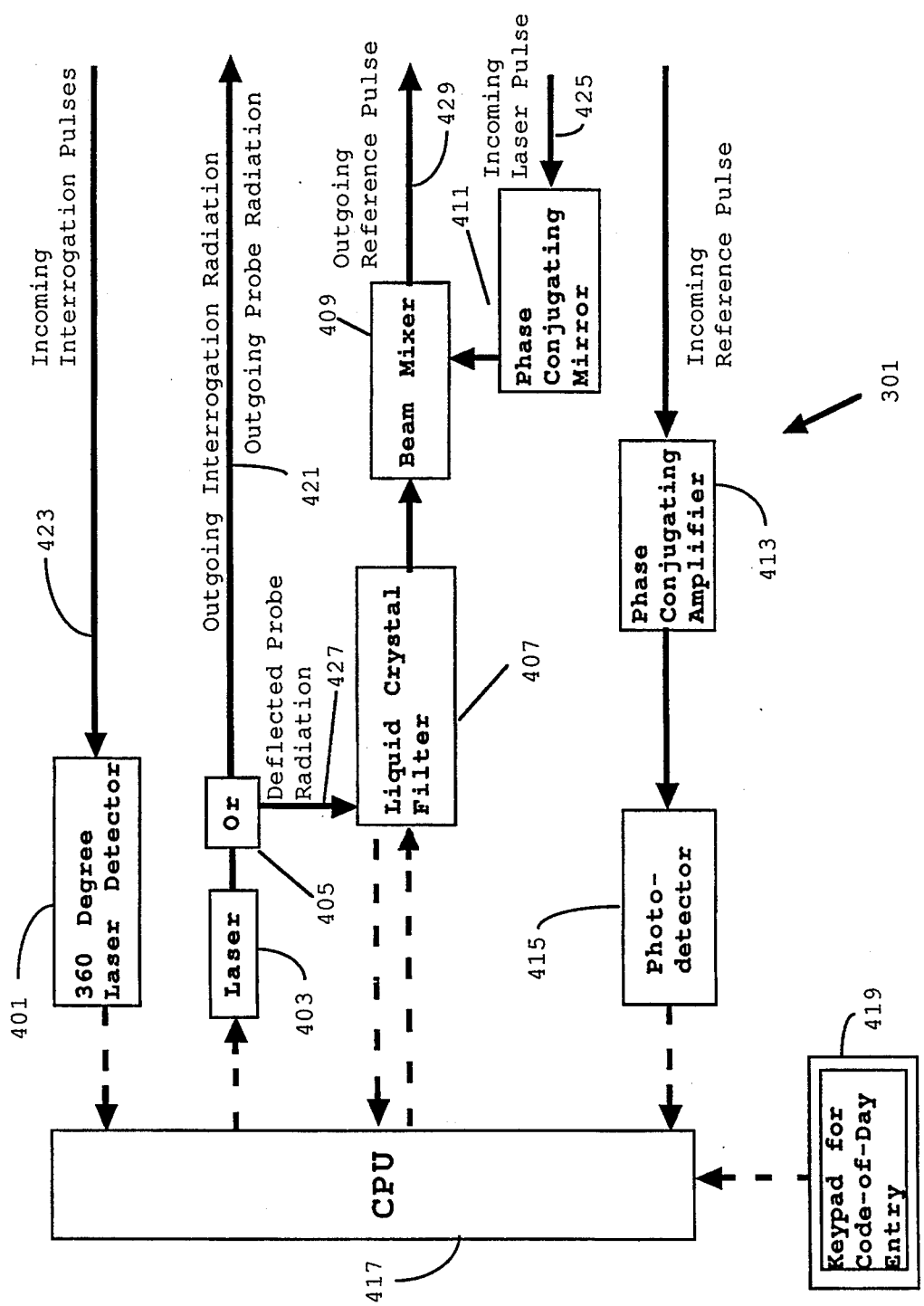
FIG. 4 is a functional block diagram of a preferred embodiment of a typical identification device.

FIG. 4 gives a functional block diagram of first identification device 301 whose operation is explained as it interacts with a typical second identification device 303 which is identical to device 301 in all aspects except in its location on the battlefield. Hence, the descriptions of identification device 301 that follow are equally applicable to identification device 303. The locations of the first and second devices relative to each other are not limited to those shown in FIG. 3 but may be anywhere in space provided there are optical paths between them. Broken arrows as used in FIG. 4 indicate electrical signal paths provided by conventional, well-known electrical connections.

In operation, then, omni-directional laser detector 401 of device 301 surveys the heavens and the earth for any interrogation radiation that may emanate from second identification device 303. If any such interrogation radiation is present and is incoming along typical optical path 423, it is incident on laser detector 401. Upon incidence of any interrogation radiation, the detector generates an initiating signal which is subsequently electrically coupled to CPU 417 via any well-known electrical connection. CPU 417, in response to the signal, triggers laser 403 to transmit probe radiation outwardly toward the source of the incoming interrogation radiation. The outgoing interrogation radiation is emitted by laser 403 independently of any initiating signal from laser detector 401, depending only on the commands of the CPU operator, toward second device 303 on remote object 309 to elicit a response from the second device. The response is most likely to be an incoming probe radiation along optical path 425 from the second device.

The outgoing probe radiation transmitted by laser 403 in response to incoming interrogation radiation travels along initial path 421. But from time to time as commanded by CPU 417, mirror 405 in the initial path as shown, deflects the probe radiation from its initial path to alternate path 427. The deflected probe radiation is then incident on liquid crystal filter 407 which is activated by CPU 417 synchronously with the deflective motion of mirror 405. Upon activation by the CPU, filter 407 embeds a pre-determined pattern into the deflected probe radiation, thereby creating patterned probe radiation, prior to transmitting the patterned probe radiation further to beam mixer 409. Meanwhile, incoming probe radiation along linear optical path 425 from second identification device 303 is incident on phase conjugating mirror 411 and is thereby phase conjugated. The phase conjugated radiation then proceeds to beam mixer 409 where it is mixed with patterned probe radiation and results in outgoing reference radiation. The outgoing reference radiation, containing the pre-determined pattern and phase conjugate of incoming probe radiation, travels along optical path 429 which is one and the same as path 425 (even though shown separately in the drawing for illustrative purposes only) but in the reverse direction. On its return trip to its source, any and all atmospheric distortions that may have been introduced into the incoming probe radiation on its first trip are removed. Now, switching sides: incoming reference radiation, originating at identification device 303 in the same manner as above-described for identification device 301 and containing the pre-determined pattern, arrives at phase conjugating amplifier 413, with all the original atmospheric distortion removed. Amplifier 413 is used in the identification device so that even a very low power information signal can be received and processed. Another advantage to using the amplifier is that because a low power signal can be recognized, the patterned image information can be detected and recognized in any portion of the radiation, i.e., the entire beam of radiation needs not be collected by the identification device to divine the image. Therefore, the fact that the radiation will diverge in its travel is not a problem. The amplified radiation is further optically coupled from amplifier 413 to photo-detector 415 which produces an output signal from the radiation. The photo-detector then subsequently electrically couples the output signal to CPU 417 which performs appropriate functions to isolate and display the pattern embedded in the signal. If the isolated pattern matches the pattern embedded by liquid crystal filter 407 in the deflected probe radiation outgoing from device 301, then the operator of the first device recognizes the second device 303, the source of the isolated pattern, as belonging to a friendly vehicle. The pattern to be used by the filter can be changed by the CPU in response to commands received from a suitable keypad, the keypad being manipulated by a human operator. All of the various radiations referred to in the above description of the operation of the identification devices may be in pulse form. For example, a code-of-the-day that was made known previously to all friendly forces can be input by the human operator to CPU 417 which suitably triggers laser 403 to emit interrogation radiation bearing the code. Second identification device 303 will respond by emitting a probe radiation toward identification device 301 only upon detecting interrogation radiation bearing the code, thus commencing the self-identification/object recognition process.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

We claim:

1. An object identification device using optical phase conjugation, said device comprising:
a means for transmitting outgoing probe radiation along an initial optical path toward a remote object; a means for selectively deflecting said outgoing. probe radiation away from said initial path to an alternate path and embedding a pre determined pattern into said deflected probe radiation thereby creating patterned radiation; an optical processing means adapted for receiving therein said patterned radiation from said deflecting and embedding means and receiving incoming probe radiation along a linear optical path from said remote object and processing said radiations together to produce outgoing reference radiation therefrom and propagating said outgoing reference radiation along said linear optical path toward said object; and a photo-detecting means positioned to receive thereon incoming reference radiation from said object and produce therefrom output signals, said output signals containing information indicative of the identity of said remote object.

2. An object identification device as set forth in claim 1, wherein said deflecting and embedding means comprises a liquid crystal filter suitable for embedding a pattern into radiation passing therethrough and a mirror for providing an OR function, said filter and mirror being activated synchronously, and said mirror being suitably positioned between said transmitting means and said filter to deflect selectively said outgoing probe radiation from said transmitting means to said filter.

3. An object identification device as set forth in claim 2, wherein said optical processing means comprises a phase conjugator, said conjugator being adapted for receiving and phase-conjugating incoming probe radiation from said object and outputting phase-conjugated probe radiation; and an optical mixer, said mixer being coupled between said filter and said conjugator to receive patterned radiation and phase-conjugated probe radiation from said filter and said conjugator, respectively, and mixing the radiations to produce outgoing reference radiation.

4. An object identification device as set forth in claim 3, wherein said device further comprises an omni-directional laser detector to detect laser radiation emanating from any source in space and producing an initiating signal in response thereto, said initiating signal causing the emission of said outgoing probe radiation by said transmitting means.

5. An object identification device as set forth in claim 4, wherein said device further comprises a phase-conjugating amplifier, said amplifier being appropriately positioned with respect to said photo-detecting means so as to intercept and amplify incoming reference radiation from said remote object prior to sending the radiation to be incident on said photo-detecting means.

6. An object identification device as set forth in claim 5, wherein said device further comprises an automating means, said automating means being coupled in parallel to said laser detector, transmitting means, deflecting and embedding means and photo-detecting means, respectively, to receive said initiating signal from said laser detector and, in response thereto, trigger said transmitting means to transmit outgoing probe radiation, activate said embedding means synchronously with the selective motion of said mirror and receive said output signals from said photo-detecting means and process said output signals to isolate any embedded pattern for identification of said object.

7. A method for identifying an object in space, said method comprising the steps of:
transmitting outgoing interrogation radiation toward the object to elicit a response from said object;
embedding selectively outgoing probe radiation with a pre-determined pattern;
receiving incoming probe radiation from said object;
phase-conjugating the incoming probe radiation;
mixing the phase-conjugated probe radiation with the patterned probe radiation and producing outgoing reference radiation;
propagating the outgoing reference radiation toward said object;
detecting incoming reference radiation from said object; and
processing the incoming reference radiation to accomplish the identification of said object.

* * * * *